(12) United States Patent
Hotta et al.

(10) Patent No.: US 10,509,620 B2
(45) Date of Patent: Dec. 17, 2019

(54) DISPLAY CONTROL APPARATUS, DISPLAY APPARATUS, DISPLAY SYSTEM, AND COMPUTER-READABLE STORAGE MEDIUM

(71) Applicant: EIZO Corporation, Ishikawa (JP)

(72) Inventors: Kentaro Hotta, Ishikawa (JP); Kenji Hiraki, Ishikawa (JP); Koji Kobayashi, Ishikawa (JP); Tsuyoshi Morishita, Ishikawa (JP); Ryotaro Imai, Ishikawa (JP); Ikumi Arai, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 37 days.

(21) Appl. No.: 15/884,378

(22) Filed: Jan. 31, 2018

(65) Prior Publication Data

US 2018/0157456 A1 Jun. 7, 2018

Related U.S. Application Data

(63) Continuation of application No. PCT/JP2015/071852, filed on Jul. 31, 2015.

(51) Int. Cl.
*H04B 1/38* (2015.01)
*G06F 3/147* (2006.01)
(Continued)

(52) U.S. Cl.
CPC ............ *G06F 3/147* (2013.01); *G06F 3/0481* (2013.01); *G06F 13/00* (2013.01); *H04M 1/72583* (2013.01); *H04W 76/14* (2018.02)

(58) Field of Classification Search
CPC ........ G06F 3/147; G06F 3/0481; G06F 13/00; H04W 76/14; H04M 1/72583
(Continued)

(56) References Cited

U.S. PATENT DOCUMENTS

2003/0063128 A1* 4/2003 Salmimaa ........... G06F 3/04817
715/810
2003/0233650 A1 12/2003 Zaner
(Continued)

FOREIGN PATENT DOCUMENTS

| JP | 2004-070701 A | 3/2004 |
| JP | 2013-021442 A | 1/2013 |
| WO | 2012/157328 A1 | 11/2012 |

OTHER PUBLICATIONS

Extended European Search Report issued for counterpart European Application 15900343.3, issued by the European Patent Office dated Jun. 15, 2018.
(Continued)

*Primary Examiner* — Huy C Ho

(57) ABSTRACT

A display control apparatus including a first icon storage section storing a first icon; a second icon storage section storing a second icon; a first correspondence information storage section storing a combination of mobile terminal identification information and application identification information, in association with the second icon; a mobile terminal identification information receiving section receiving mobile terminal identification information from a mobile terminal; an application identification information receiving section receiving application identification information from the mobile terminal; and a display control section displaying the second icon in a display section if the combination of mobile terminal identification information received by the mobile terminal identification information receiving section and application identification information received by the application identification information receiving section is stored in the first correspondence information storage section, and displaying the first icon in the display section if not stored in the first correspondence information storage section.

12 Claims, 5 Drawing Sheets

(51) Int. Cl.
*G06F 13/00* (2006.01)
*G06F 3/0481* (2013.01)
*H04W 76/14* (2018.01)
*H04M 1/725* (2006.01)

(58) Field of Classification Search
USPC .......................................................... 455/557
See application file for complete search history.

(56) References Cited

U.S. PATENT DOCUMENTS

| | | |
|---|---|---|
| 2006/0242602 A1 | 10/2006 | Schechter |
| 2011/0316817 A1 | 12/2011 | Yamada |
| 2012/0246587 A1 | 9/2012 | Migishima |
| 2013/0009983 A1 | 1/2013 | Ishitsuka |
| 2013/0326367 A1 | 12/2013 | Nakamura |
| 2014/0181183 A1 | 6/2014 | Houjou et al. |
| 2014/0358536 A1* | 12/2014 | Choi .................... G10L 15/26 704/235 |
| 2016/0035311 A1 | 2/2016 | Ryo |

OTHER PUBLICATIONS

International Preliminary Report on Patentability for International Application No. PCT/JP2015/071852, issued by the International Bureau of WIPO dated Feb. 6, 2018.

International Search Report for International Patent Application No. PCT/JP2015/071852, issued by the Japan Patent Office dated Oct. 20, 2015.

Office Action issued for counterpart Australian Application No. 2015405015, reported by the Australian Patent Office dated Nov. 1, 2018.

Office Action issued for counterpart Russian Application No. 2018103327, issued by The Federal Institute for Intellectual Property dated Nov. 13, 2018.

Concise Statement of Relevance for Office Action issued for counterpart Russian Application No. 2018103327, issued by The Federal Institute for Intellectual Property dated Nov. 13, 2018.

\* cited by examiner

DISPLAY CONTROL APPARATUS, DISPLAY APPARATUS, DISPLAY SYSTEM, AND COMPUTER-READABLE STORAGE MEDIUM

The contents of the following patent application are incorporated herein by reference:
No. PCT/JP2015/071852 filed on Jul. 31, 2015

BACKGROUND

1. Technical Field

The present invention relates to a display control apparatus, a display apparatus, a display system, and a computer-readable storage medium.

2. Related Art

An image display apparatus is known including a control section for displaying notification that a mobile telephone connected to an HDMI (Registered Trademark) port of the image display apparatus has received a call or message, when the mobile telephone receives such a call or message, as shown in Patent Document 1, for example.
Patent Document 1: Japanese Patent Application Publication No. 2013-021442
There is a demand for the user of the display apparatus to be able to be more appropriately informed about the state of the mobile telephone.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
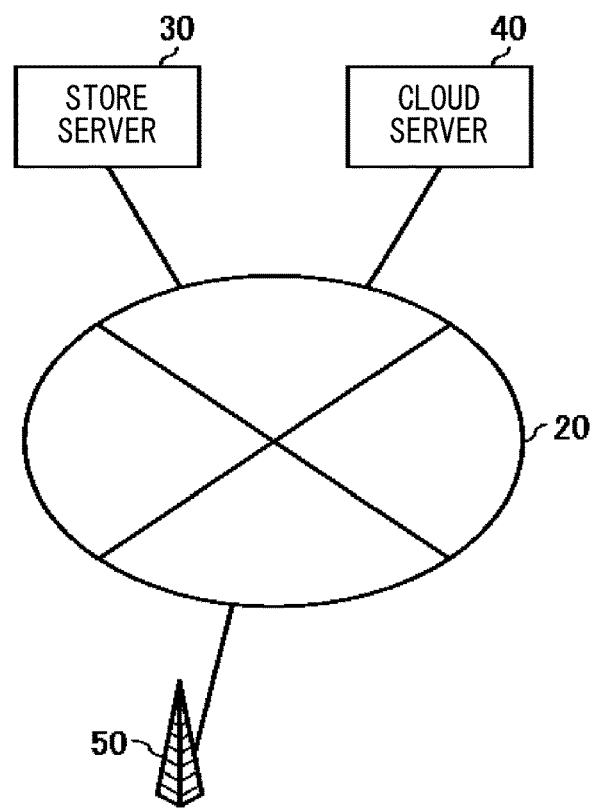
FIG. 1 schematically shows an exemplary display system 10.
Figure 1:
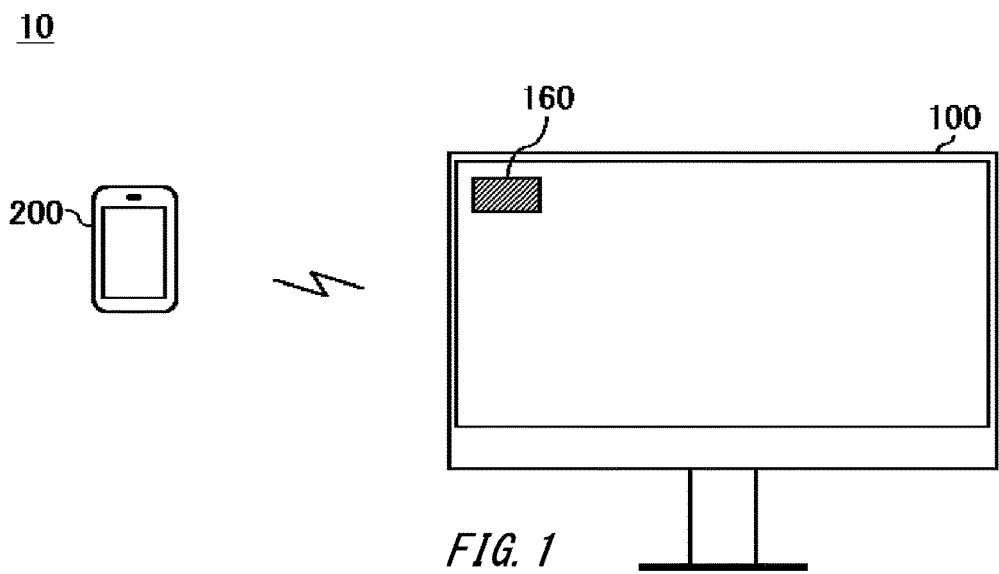

FIG. 1 schematically shows an exemplary display system 10. The display system 10 includes a display apparatus 100 and a mobile terminal 200. The display apparatus 100 according to the present embodiment displays an icon 160 corresponding to an event, such as reception of a phone call, reception of mail, reception from an SNS (Social Network Service), and reception of a message from a game, in the mobile terminal 200 with which a wireless connection has been established, when the event occurs, to notify the user of the display apparatus 100 about the occurrence of the event.

The display apparatus 100 may include a default icon (sometimes referred to as a standard icon) stored in advance. The display apparatus 100 may include an icon (sometimes referred to as a special icon) purchased from a store server 30 using the mobile terminal 200. The display apparatus 100 receives the special icon from the mobile terminal 200 via a BLE communication connection and stores the special icon, for example.

The display apparatus 100 may store a combination of application identification information and mobile terminal identification information of the mobile terminal 200 that transmitted the special icon, in association with the special icon. The mobile terminal identification information may be any information that enables identification of the mobile terminal 200. For example, the mobile terminal identification information is pairing information for a BLE communication connection. Alternatively, the mobile terminal identification information may be pairing information for a Bluetooth (Registered Trademark) communication connection, a telephone number, personal identification information, a terminal identification number, a MAC (Media Access Control) address, or the like. The application identification information may be any information that enables identification of an application. For example, the application identification information is a package name of an application.

The mobile terminal 200 transmits the application identification information of the application that caused the event to the display apparatus 100. If the combination of application identification information and mobile terminal identification information received from the mobile terminal 200 is stored in association with the special icon, the display apparatus 100 displays this special icon. Furthermore, if the combination of application identification information and mobile terminal identification information received from the mobile terminal 200 is not stored in association with the special icon, the display apparatus 100 displays the standard icon.

The display apparatus 100 may store a plurality of special icons. The display apparatus 100 may store each of a plurality of combinations of application identification information and mobile terminal identification information in association with a respective one of the plurality of special icons.

When the application identification information is received from the mobile terminal 200, the display apparatus 100 may display a special icon associated with the received combination of application identification information and mobile terminal identification information of the mobile terminal 200, from among the plurality of special icons. In this way, when an event occurs in the mobile terminal 200, it is possible to display the special icon corresponding to the event from among the special icons preferred by the user and purchased using the mobile terminal 200.

A plurality of combinations of application identification information and mobile terminal identification information may be stored in association with the same special icon. For example, a plurality of combinations of a plurality of pieces of application identification information for SNS applications and mobile terminal identification information are stored in association with one special icon representing a SNS. In this way, it is possible to notify the user of the display apparatus 100 that a message has been received from one of the plurality of SNSs, it does not matter from which SNS the message has been received in this case.

The display apparatus 100 may store a plurality of standard icons. The display apparatus 100 may store each of a plurality of combinations of application identification information and mobile terminal identification information in association with a respective one of the plurality of standard icons.

If the application identification information has been received from the mobile terminal 200 and the received combination of application identification information and mobile terminal identification information of the mobile terminal 200 is not associated with a special icon but is associated with a standard icon, the display apparatus 100 may display the standard icon corresponding to the received combination of application identification information and mobile terminal identification information of the mobile terminal 200. In this way, even when a special icon corresponding to the application that caused the event in the mobile terminal 200 is not stored in the display apparatus 100, it is possible to display the standard icon corresponding to the event and to notify the user what type of event has occurred in the mobile terminal 200.

The mobile terminal 200 may access the store server 30 that sells icons, via a wireless base station 50 and a network 20. The mobile terminal 200 and the wireless base station 50 may communicate wirelessly using an arbitrary communication method. For example, the mobile terminal 200 and the wireless base station 50 communicates wirelessly using a 2G ($2^{nd}$ Generation) communication method such as GSM (Global System for Mobile Communications) (Registered Trademark) or PDC (Personal Digital Cellular), a 3G ($3^{rd}$ Generation) communication method such as WCDMA (Wideband Code Division Multiple Access) (Registered Trademark) and CDMA 2000 (Code Division Multiple Access 2000), a 3.9G communication method such as LTE (Long Term Evolution), a 4G communication method such as Advanced LTE, or a communication method later than 4G. The network 20 may include the Internet and a telephone network. The mobile terminal 200 may access the store server 30 via a Wi-Fi (Wireless Fidelity) (Registered Trademark) access point and the network 20.

The mobile terminal 200 may receive an icon from a cloud server 40 after the icon purchasing procedure with the store server 30 has been completed. The display apparatus 100 may receive, from the mobile terminal 200, the icon that the mobile terminal 200 received from the cloud server 40. The display apparatus 100 may receive the icon from the cloud server 40 after the icon purchasing procedure with the store server 30 has been completed by the mobile terminal 200.

Figure 2:
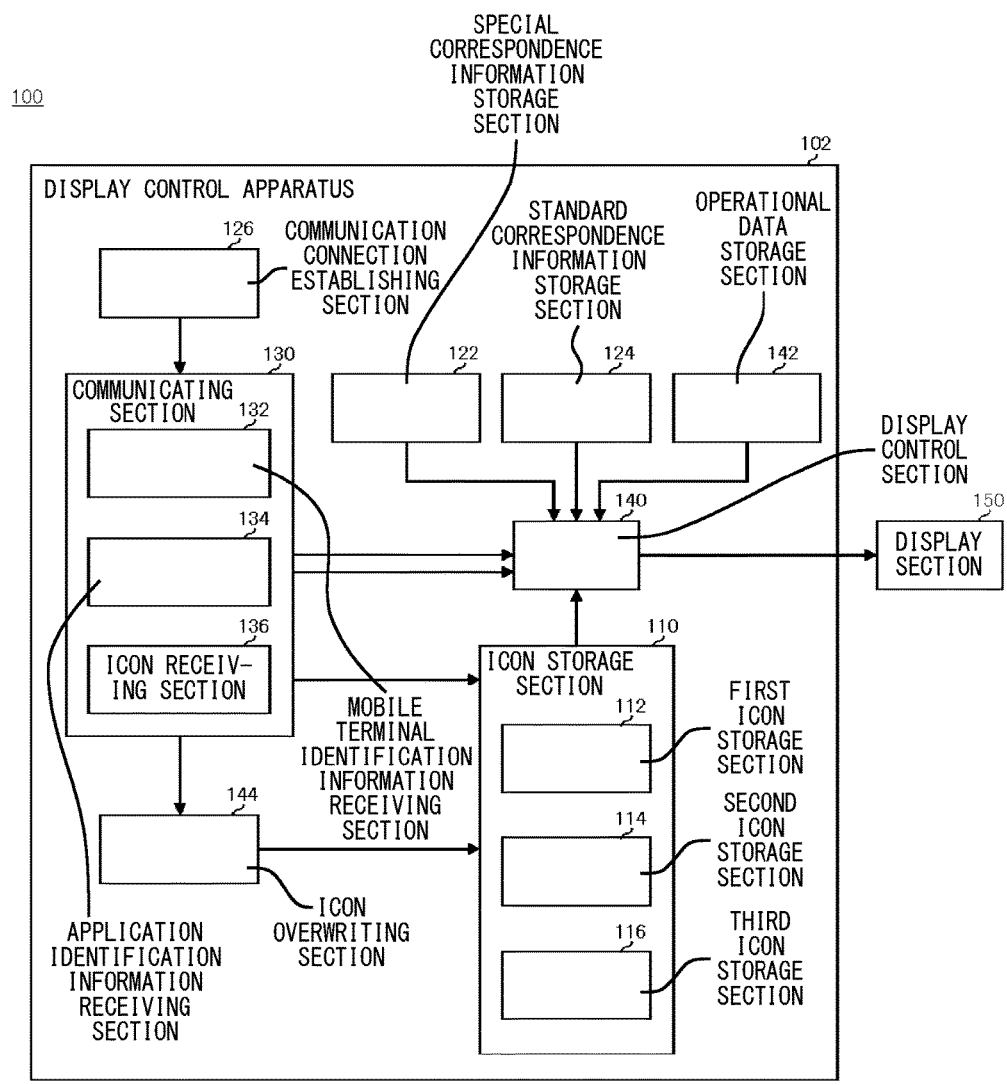
FIG. 2 schematically shows an exemplary functional configuration of the display apparatus 100.

FIG. 2 schematically shows an exemplary functional configuration of the display apparatus 100. The display apparatus 100 includes a display control apparatus 102 and a display section 150. The display control apparatus 102 includes an icon storage section 110, a special correspondence information storage section 122, a standard correspondence information storage section 124, a communication connection establishing section 126, a communicating section 130, a display control section 140, an operational data storage section 142, and an icon overwriting section 144. The display control apparatus 102 does not necessarily need to include all of these components.

The icon storage section 110 stores the standard icon and the special icon. In the present embodiment, the icon storage section 110 includes a first icon storage section 112, a second icon storage section 114, and a third icon storage section 116.

The first icon storage section 112 stores the standard icon. The standard icon stored by the first icon storage section 112 is sometimes referred to as a first icon. The first icon storage section 112 may store a plurality of standard icons. The first icon storage section 112 stores five standard icons, for example. The data stored in the first icon storage section 112 may be data that is not allowed to be overwritten.

The second icon storage section 114 and the third icon storage section 116 store the special icons. The special icon stored by the second icon storage section 114 is sometimes referred to as a second icon. The special icon stored by the third icon storage section 116 is sometimes referred to as a third icon. The second icon storage section 114 may store a plurality of special icons. The second icon storage section 114 stores five special icons, for example. The third icon storage section 116 may store a plurality of special icons. The third icon storage section 116 stores five special icons, for example.

If the second icon storage section 114 and the third icon storage section 116 both store special icons, the icon storage section 110 may manage the special icons stored in one of these icon storage sections as active special icons. The icon storage section 110 may manage whichever of the second icons and the third icons were stored later as the active special icons. The icon storage section 110 may prohibit whichever of the second icons and the third icons were stored earlier from being set as the active special icons.

The special correspondence information storage section 122 stores the combinations of mobile terminal identification information and application identification information in association with the special icons. The special correspondence information storage section 122 may store the combinations of mobile terminal identification information and application identification information in association with the special icons that were stored later among the second icons and third icons. The special correspondence information storage section 122 may store each of the plurality of combinations of mobile terminal identification information and application identification information in association with a respective one of the plurality of special icons. The special correspondence information storage section 122 is one example of a first correspondence information storage section.

The standard correspondence information storage section 124 stores combinations of mobile terminal identification information and application identification information in association with the standard icons. The standard correspondence information storage section 124 may store each of a plurality of combinations of mobile terminal identification information and application identification information in association with a respective one of the plurality of standard icons. The standard correspondence information storage section 124 is one example of a second correspondence information storage section.

The communication connection establishing section 126 establishes a communication connection with the mobile terminal 200. The communication connection establishing section 126 may establish the communication connection with the mobile terminal 200 in accordance with an arbitrary communication method. For example, the communication connection establishing section 126 establishes a BLE communication connection with the mobile terminal 200. Furthermore, the communication connection establishing section 126 may establish a Bluetooth (Registered Trademark) communication connection with the mobile terminal 200. Yet further, the communication connection establishing section 126 may establish a communication connection with the mobile terminal 200 via a Wi-Fi (Registered Trademark) access point.

The communicating section 130 communicates with the mobile terminal 200 via the communication connection established by the communication connection establishing section 126. The communicating section 130 includes a mobile terminal identification information receiving section 132, an application identification information receiving section 134, and an icon receiving section 136.

The mobile terminal identification information receiving section 132 receives the mobile terminal identification information from the mobile terminal 200. For example, the mobile terminal identification information receiving section 132 receives, from the communication connection establishing section 126, pairing information received from the mobile terminal 200 at the time when the BLE communication connection or Bluetooth (Registered Trademark) communication connection is established with the mobile terminal 200 by the communication connection establishing section 126. As another example, the mobile terminal identification information receiving section 132 receives, from the communication connection establishing section 126, the mobile terminal identification information received from the mobile terminal 200 at the time when communication connection was established with the mobile terminal 200 by the communication connection establishing section 126 in accordance with another communication method. If the mobile terminal 200 transmits the mobile terminal identification information in addition to the application identification information corresponding to an event when this event occurs in the mobile terminal 200, for example, the mobile terminal identification information receiving section 132 may receive this mobile terminal identification information.

The application identification information receiving section 134 receives the application identification information from the mobile terminal 200. The application identification information receiving section 134 may receive the application identification information corresponding to the event that occurred, which was transmitted by the mobile terminal 200 when this event occurred in the mobile terminal 200.

The icon receiving section 136 receives the icons. For example, the icon receiving section 136 receives the special icons from the mobile terminal 200. As an example, after the purchasing procedure of a new special icon has been completed, the mobile terminal 200 transmits the new special icon to the display apparatus 100.

The display control section 140 displays a standard icon or a special icon in the display section 150. If a combination of the mobile terminal identification information received by the mobile terminal identification information receiving section 132 and the application identification information received by the application identification information receiving section 134 is stored in the special correspondence information storage section 122, the display control section 140 displays the special icon corresponding to this combination in the display section 150. Furthermore, if a combination of the mobile terminal identification information received by the mobile terminal identification information receiving section 132 and the application identification information received by the application identification information receiving section 134 is not stored in the special correspondence information storage section 122, the display control section 140 displays a standard icon in the display section 150.

At this time, if the first icon storage section 112 stores only one standard icon, the display control section 140 may display this standard icon in the display section 150. If the first icon storage section 112 stores a plurality of standard icons and the combination of the mobile terminal identification information received by the mobile terminal identification information receiving section 132 and the application identification information received by the application identification information receiving section 134 is stored in the standard correspondence information storage section 124, the display control section 140 may display the standard icon corresponding to this combination in the display section 150. If the mobile terminal identification information received by the mobile terminal identification information receiving section 132 and the application identification information received by the application identification information receiving section 134 are not stored in the standard correspondence information storage section 124, the display control section 140 may display any one of the plurality of standard icons in the display section 150. The standard icon displayed when the mobile terminal identification information received by the mobile terminal identification information receiving section 132 and the application identification information received by the application identification information receiving section 134 are not stored in the standard correspondence information storage section 124 may be set in advance.

The operational data storage section 142 stores the operational data indicating how the icons are to be displayed in the display section 150. The operational data may indicate arbitrary operations. For example, the operational data indicates operations such as fade-in, slide-in, float-in, split, and wipe. The operational data storage section 142 may store operational data for each of the plurality of special icons. Furthermore, the operational data storage section 142 may store operational data for each of the plurality of standard icons. If operational data corresponding to the icon displayed in the display section 150 is stored in the operational data storage section 142, the display control section 140 may display this icon in accordance with this operational data.

The icon overwriting section 144 overwrites the special icons stored in the icon storage section 110. For example, in a state where a plurality of second icons are stored in the second icon storage section 114 and a plurality of third icons are stored in the third icon storage section 116, if the icon receiving section 136 receives a plurality of new special icons, the icon overwriting section 144 overwrites whichever of the plurality of second icons and the plurality of third icons were stored earlier, with the newly received plurality of special icons. These new special icons are an example of fourth icons. The icon overwriting section 144 may start the overwriting process between when the icon receiving section 136 begins receiving the new plurality of special icons and when the icon receiving section 136 stops receiving the new plurality of special icons.

When overwriting is performed by the icon overwriting section 144, the special correspondence information storage section 122 may update the associations with the combinations of mobile terminal identification information and application identification information to correspond to the special icons after the overwriting. In this way, the special icons after the overwriting can be activated. If an overwriting error occurs for reasons such as movement of the mobile terminal 200 or changes in the radio wave environment while the icon overwriting section 144 is performing the overwriting with the newly received plurality of special icons, the special correspondence information storage section 122 does not update the combinations of mobile terminal identification information and application identification information. In this way, it is possible to prevent the activation of special icons for which the data is possibly corrupted by the overwriting error.

Figure 3:
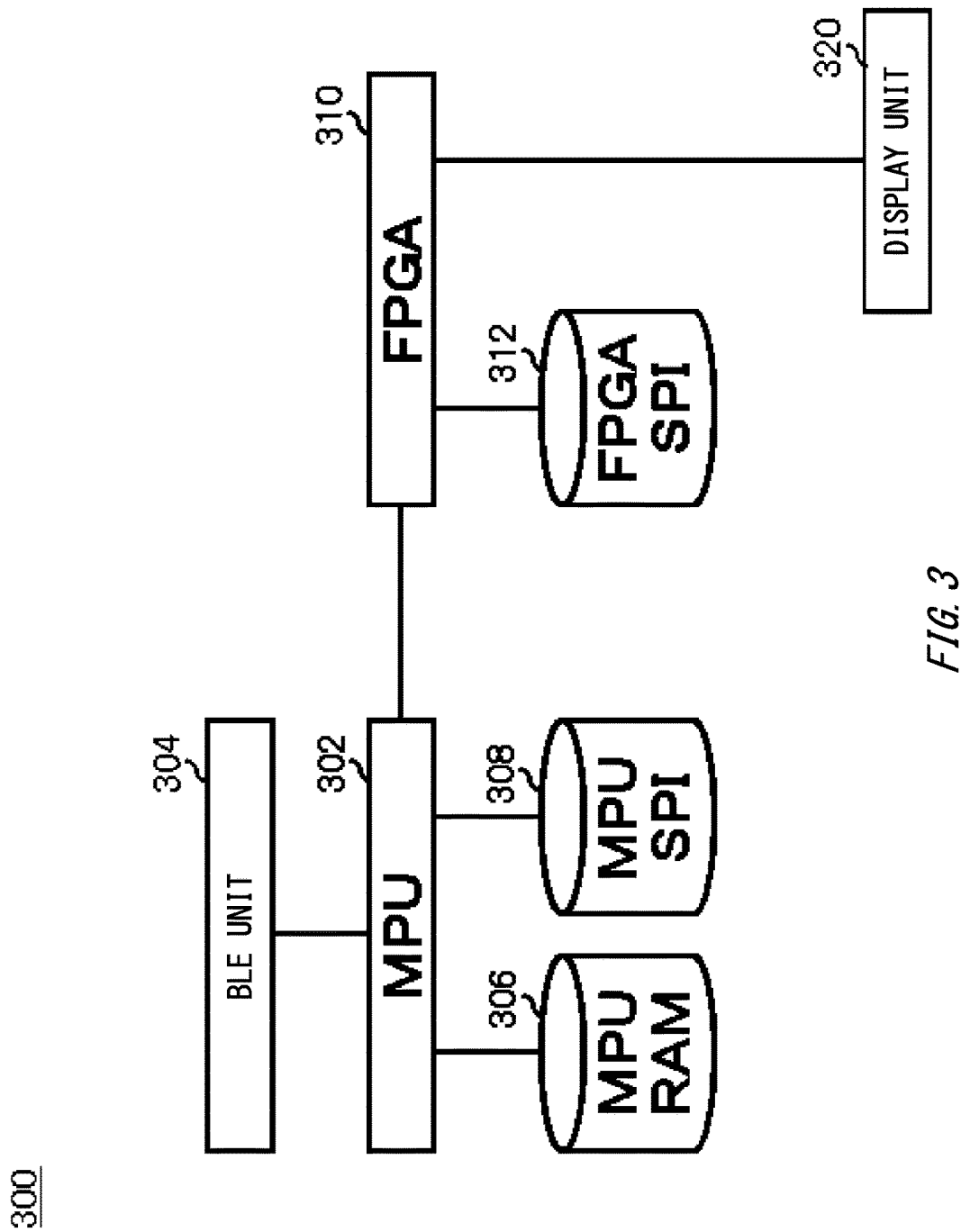
FIG. 3 schematically shows the configuration of a monitor 300 that is an implementation example of the display apparatus 100.

FIG. 3 schematically shows the configuration of a monitor 300 that is an implementation example of the display apparatus 100. The monitor 300 includes an MPU (Micro Processing Unit) 302, a BLE unit 304, an MPU-RAM (Random Access Memory) 306, an MPU-SPI (Serial Peripheral Interface) 308, an FPGA (Field Programmable Gate Array) 310, and a display unit 320.

The MPU 302 controls the operation of the entire monitor 300. The BLE unit 304 controls the BLE communication. The BLE unit 304 may be one example of the communication connection establishing section 126 and the communicating section 130.

The MPU-RAM 306 stores the application identification information received by the BLE unit 304 from the mobile terminal 200. The MPU-SPI 308 may be one example of the special correspondence information storage section 122 and the standard correspondence information storage section 124.

The FPGA 310 may be one example of the display control section 140. The FPGS-SPI 312 may be one example of the icon storage section 110. The FPGS-SPI 312 may store icon identification information for identifying the icons, in association with a respective one of the plurality of icons. The display unit 320 may be one example of the display section 150.

The MPU 302 judges whether a combination of the mobile terminal identification information of the mobile terminal 200 and the received application identification information is stored in the MPU-SPI 308, in response to the BLE unit 304 receiving the application identification information from the mobile terminal 200. If the combination of the mobile terminal identification information and the application identification information is associated with a special icon, the MPU 302 reads the icon identification information of this special icon from the MPU-SPI 308.

If the combination of the mobile terminal identification information and the application identification information is not associated with a special icon but is associated with a standard icon, the MPU 302 reads the icon identification information of this standard icon from the MPU-SPI 308. If the combination of the mobile terminal identification information and the application identification information is not associated with a special icon and also not associated with a standard icon, the MPU 302 reads the icon identification information of one preset standard icon from the MPU-SPI 308. The MPU 302 then transmits the read icon identification information to the FPGA 310.

The FPGA 310 reads the icon corresponding to the icon identification information received from the MPU 302, from the FPGS-SPI 312. The FPGA 310 then displays the read icon in the display unit 320.

Figure 4:
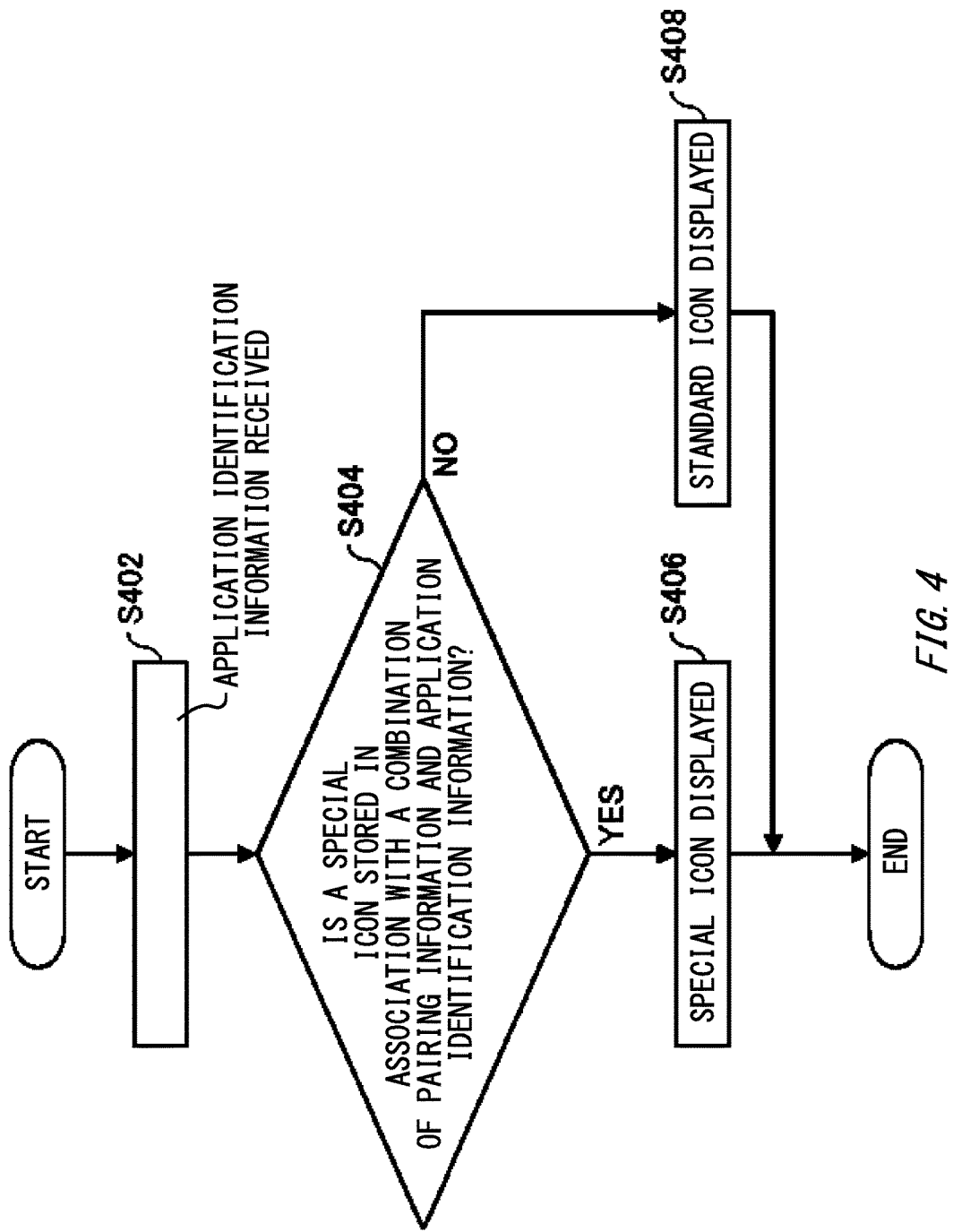
FIG. 4 schematically shows an exemplary flow of the process performed by the display apparatus 100.

FIG. 4 schematically shows an exemplary flow of the process performed by the display apparatus 100. The process shown in FIG. 4 is described using a state in which a BLE communication connection is established between the display apparatus 100 and the mobile terminal 200 as an initial state. The process shown in FIG. 4 is performed with the control section of the display apparatus 100 serving as the subject.

At step 402 (step is abbreviated as S), the application identification information receiving section 134 receives the application identification information from the mobile terminal 200. At S404, a judgment is made concerning whether a combination of the pairing information for the BLE communication connection with the mobile terminal 200 and the application identification information received at S402 is stored in the second icon storage section 114 or the third icon storage section 116 in association with a special icon. If such a combination is judged to be stored, the process moves to S406, and if such a combination is judged not to be stored, the process moves to S408.

At S406, the display control section 140 displays, in the display section 150, the special icon corresponding to the combination of the pairing information for the BLE communication connection with the mobile terminal 200 and the application identification information received at S402.

At S408, the display control section 140 displays a standard icon in the display section 150. If a standard icon corresponding to the combination of the pairing information for the BLE communication connection with the mobile terminal 200 and the application identification information received at step S402 is stored, the display control section 140 may display this standard icon, and if such a standard icon is not stored, the display control section 140 may display one preset standard icon stored in the first icon storage section 112.

Figure 5:
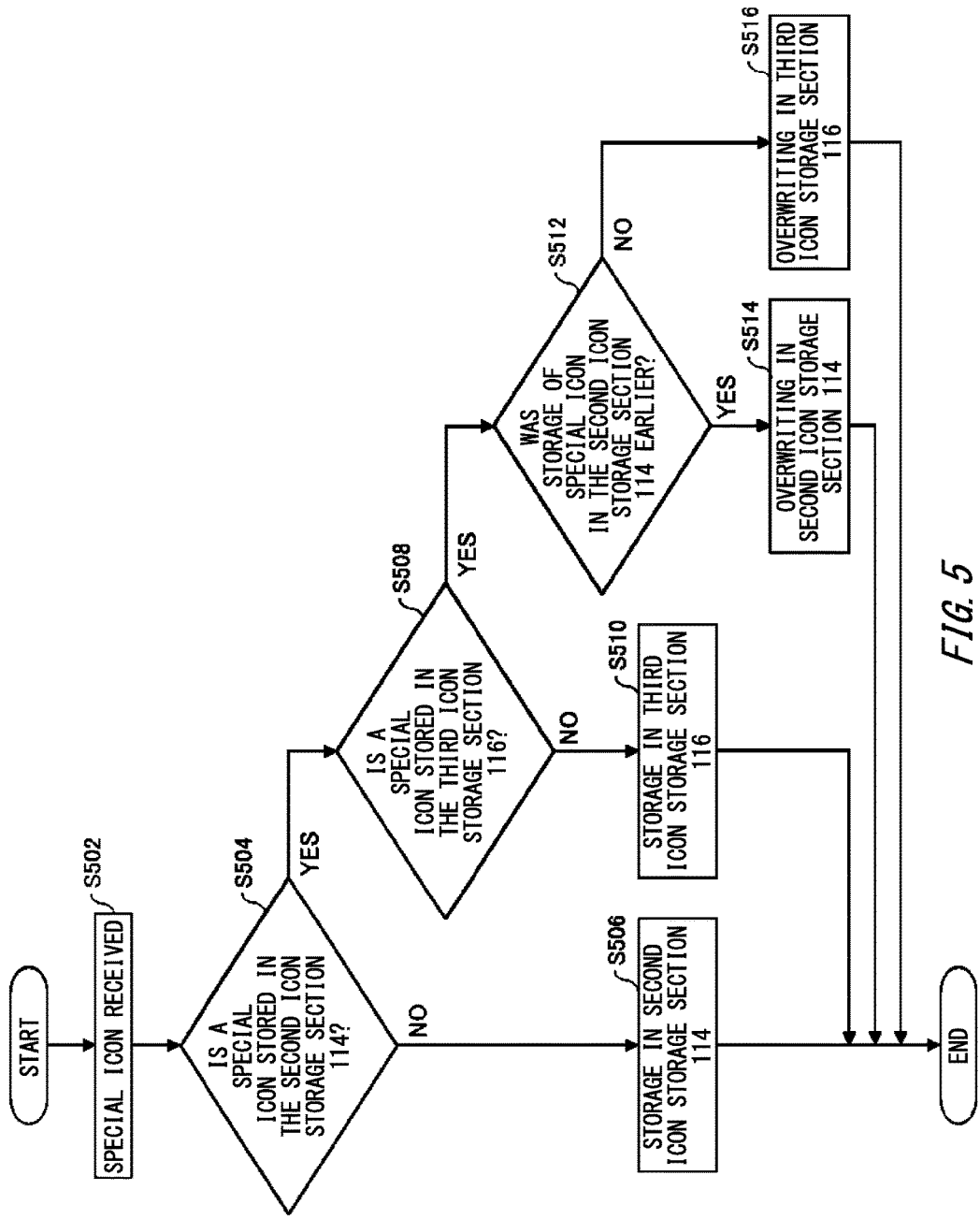
FIG. 5 schematically shows an exemplary flow of the process performed by the display apparatus 100.

FIG. 5 schematically shows an exemplary flow of the process performed by the display apparatus 100. Here, the process flow for a case in which the icon receiving section 136 receives a special icon is described. Each process shown in FIG. 5 is performed with the control section of the display apparatus 100 as the subject.

At S502, the icon receiving section 136 receives the special icon from the mobile terminal 200. At S504, a judgment is made about whether a special icon is stored in the second icon storage section 114. If a special icon is judged not to be stored, the process moves to S506, and if a special icon is judged to be stored, the process moves to S508. At S506, the special icon received at S502 is stored in the second icon storage section 114. Here, according to instructions from the mobile terminal 200, the special correspondence information storage section 122 may store the combination of the mobile terminal identification information of the mobile terminal 200 and the application identification information in association with the special icon stored in the second icon storage section 114. For example, the special correspondence information storage section 122 stores the combination of the mobile terminal identification information of the mobile terminal 200 and the application identification information transmitted from the mobile terminal 200, in association with the special icon stored in the second icon storage section 114.

At S508, a judgment is made about whether a special icon is stored in the third icon storage section 116. If a special icon is judged not to be stored, the process moves to S510, and if a special icon is judged to be stored, the process moves to S512. At S510, the special icon received at S502 is stored in the third icon storage section 116. Here, the special correspondence information storage section 122 may change the association of the combination of the mobile terminal identification information and the application identification information from being with the second icon stored in the second icon storage section 114 to being with the special icon stored in the third icon storage section 116. The special correspondence information storage section 122 may perform this changing process according to the instructions from the mobile terminal 200.

At S512, a judgment is made about whether the storage of the special icon in the second icon storage section 114 was performed before the storage of the special icon in the third icon storage section 116. If the storage in the second icon storage section 114 is judged to have been earlier, the process moves to S514, and if the storage in the second icon storage section 114 is judged to not have been earlier, the process moves to S516.

At S514, the icon overwriting section 144 overwrites the special icon stored in the second icon storage section 114 with the special icon received at S502. Here, the special correspondence information storage section 122 may change the association of the combination of the mobile terminal identification information and the application identification information from being with the third icon stored in the third icon storage section 116 to being with the special icon newly stored in the second icon storage section 114.

At S516, the icon overwriting section 144 overwrites the special icon stored in the third icon storage section 116 with the special icon received at S502. Here, in accordance with this overwriting, the special correspondence information storage section 122 may change the association of the combination of the mobile terminal identification information and the application identification information from being with the second icon stored in the second icon storage section 114 to being with the special icon newly stored in the third icon storage section 116.

As described in FIG. 5, the display apparatus 100 according to the present embodiment performs overwriting in the second icon storage section 114 and the third icon storage section 116 in an alternating manner, every time a special icon is newly received. In other words, the display apparatus 100 overwrites whichever special icon is older among the special icon stored in the second icon storage section 114 and the special icon stored in the third icon storage section 116, with the new special icon.

In particular, when a special icon is received from the mobile terminal 200 via a communication method with a relatively low communication speed such as a BLE communication connection and stored, there are cases where this process requires a relatively long time. For example, if an icon set including five special icons each with a size of 128 pixels×384 pixels is received and stored, there are cases where this process takes 5 to 10 minutes. As this time becomes longer, the possibility of an error occurring during the overwriting becomes higher. In particular, if a flash memory is adopted as the second icon storage section 114 and the third icon storage section 116, the overwriting is performed in block units, and when an error occurs during the overwriting, there are cases where one entire block becomes corrupted.

In contrast to this, with the display apparatus 100 according to the present embodiment, there are two regions for storing special icons, and therefore even when an overwriting error occurs while a special icon is being written to one of these regions, it is possible to activate the other region. Furthermore, with the display apparatus 100 according to the present embodiment, when a new special icon is written the icon that is older among the two regions is overwritten, and therefore even when a writing error occurs, it is possible to prevent the special icon that is currently active from being corrupted.

With the present embodiment described above, an exemplary case is described in which the display apparatus includes the second icon storage section 114 and the third icon storage section 116 as two storage sections for storing special icons, but the present invention is not limited to this. The display apparatus 100 may include three or more storage sections for storing the special icons. In this case, it may be possible to switch which storage section is active between two storage sections among the three or more storage sections.

In the above description, each component of the display control apparatus 102 may be realized by hardware or by software, or by a combination of hardware and software.

Furthermore, a computer may function as the display control apparatus 102 by executing a program. The program may be installed in the computer that forms at least a portion of the display control apparatus 102, from a computer readable storage medium or a storage apparatus connected to a network.

The program that is installed in the computer and causes the computer to function as the display control apparatus 102 according to the present embodiment affects the CPU and the like to cause the computer to function as each section of the display control apparatus 102. The information processes recorded in the program are read by the computer, thereby causing the software and hardware resources of the display control apparatus 102 to work together as the specific means.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: display system, 20: network, 30: store server, 40: cloud server, 50: wireless base station, 100: display apparatus, 102: display control apparatus, 110: icon storage section, 112: first icon storage section, 114: second icon storage section, 116: third icon storage section, 122: special correspondence information storage section, 124: standard correspondence information storage section, 126: communication connection establishing section, 130: communicating section, 132: mobile terminal identification information receiving section, 134: application identification information receiving section, 136: icon receiving section, 140: display control section, 142: operational data storage section, 144: icon overwriting section, 150: display section, 160: icon, 200: mobile terminal, 300: monitor, 302: MPU, 304: BLE unit, 306: MPU-RAM, 308: MPU-SPI, 310: FPGA, 312: FPGS-SPI, 320: display unit

What is claimed is:

1. A display control device comprising:
a default icon storage section that stores a default icon;
a custom icon storage section that stores a custom icon;
a processor configured to:
  receive mobile terminal identification information from a mobile terminal, the mobile terminal being physically separated from the display control device and wirelessly connected to the display control device, and
  receive application identification information from the mobile terminal; and a first correspondence information storage section that stores a combination of the mobile terminal identification information and the application identification information, in association with the custom icon, wherein the processor is further configured to display the custom icon in a display section in response to receiving the application identification information from the mobile terminal when an event occurs in an application identified by the application identification information at the mobile terminal, if the combination of the mobile terminal identification information received by the processor and the application identification information received by the processor is stored in the first correspondence information storage section, and displays the default icon in the display section if the combination is not stored in the first correspondence information storage section.

2. The display control device according to claim 1, wherein the custom icon storage section stores a plurality of the custom icons, and the first correspondence information storage section stores each of a plurality of combinations of mobile terminal identification information and application identification information in association with a respective one of the plurality of custom icons.

3. The display control device according to claim 1, wherein the default icon storage section stores a plurality of the default icons, the display control device further comprises a second correspondence information storage section that stores each of a plurality of combinations of mobile terminal identification information and application identification information in association with a respective one of the plurality of default icons, and if the combination of the mobile terminal identification information received by the processor and the application identification information received by the processor is not stored in the first correspondence information storage section but is stored in the second correspondence information storage section, the processor is further configured to display in the display section the default icon associated with the combination of the mobile terminal identification information received by the processor and the application identification information received by the processor.

4. The display control device according to claim 1, further comprising:

a second custom icon storage section that stores a second custom icon, wherein the first correspondence information storage section stores a combination of mobile terminal identification information and application identification information in association with whichever icon among the custom icon and the second custom icon was stored later.

5. The display control device according to claim 4, wherein the processor is further configured to:

acquire a third custom icon; and overwrite whichever icon among the custom icon and the second custom icon was stored earlier, with the third custom icon, wherein the first correspondence information storage section stores a combination of mobile terminal identification information and application identification information in association with the third custom icon.

6. The display control device according to claim 5, wherein the processor is further configured to establish a BLE communication connection with the mobile terminal, and the mobile terminal identification information is pairing information for the BLE communication connection.

7. The display control device according to claim 6, wherein the processor is configured to receive the application identification information from the mobile terminal, via the BLE communication connection.

8. The display control device according to claim 6, wherein the processor is further configured to receive the custom icon, the second custom icon, and the third custom icon from the mobile terminal, via the BLE communication connection.

9. A display device comprising:

the display control device according to claim 1; and the display section.

10. A display system comprising:

a mobile terminal; and the display device according to claim 9.

11. A non-transitory computer readable storage medium storing thereon a program that causes a computer to:

store a default icon in a default icon storage section;

store a custom icon in a custom icon storage section;

receive mobile terminal identification information from a mobile terminal, the mobile terminal being physically separated from the computer and wirelessly connected to the computer;

receive application identification information from the mobile terminal;

store a combination of the mobile terminal identification information and the application identification information, in association with the custom icon, in a first correspondence information storage section; and display the custom icon in a display section in response to receiving the application identification information from the mobile terminal when an event occurs in an application identified by the application identification information at the mobile terminal, if the combination of the mobile terminal identification information and the application identification information is stored in the first correspondence information storage section, and displays the default icon in the display section if the combination is not stored in the first correspondence information storage section.

12. A display control device comprising:

a processor;

a controller connected to the processor;

a controller storage that is connected to the controller and that includes a default icon storage section that stores a default icon and a custom icon storage section that stores a custom icon;

a receiver that is connected to the processor and receives mobile terminal identification information and application identification information from a mobile terminal, the mobile terminal being physically separated from the display control device and wirelessly connected to the display control device; and a processor storage that is connected to the processor and that includes a first correspondence information storage section that stores a combination of the mobile terminal identification information and the application identification information, in association with the custom icon; wherein the controller displays the custom icon in a display unit in response to receiving the application identification information from the mobile terminal when an event occurs in an application identified by the application identification information at the mobile terminal, if the combination of the mobile terminal identification information and the application identification information received by the receiver is stored in the first correspondence information storage section, and displays the default icon in the display unit if the combination is not stored in the first correspondence information storage section.

* * * * *